United States Patent
Park et al.

(10) Patent No.: US 11,742,773 B2
(45) Date of Patent: Aug. 29, 2023

(54) AC-DC CONVERTER CIRCUIT SYSTEM AND METHOD OF DESIGNING AC-DC CONVERTER CIRCUIT SYSTEM

(71) Applicant: Korea Aerospace Research Institute, Daejeon (KR)

(72) Inventors: Jeong Eon Park, Daejeon (KR); Seung Hyun Choi, Incheon (KR)

(73) Assignee: Korea Aerospace Research Institute

( * ) Notice: Subject to any disclaimer, the term of this patent is extended or adjusted under 35 U.S.C. 154(b) by 50 days.

(21) Appl. No.: 17/379,897

(22) Filed: Jul. 19, 2021

(65) Prior Publication Data
US 2022/0029551 A1    Jan. 27, 2022

(30) Foreign Application Priority Data

Jul. 21, 2020   (KR) .................. 10-2020-0090287

(51) Int. Cl.
*H02M 7/217* (2006.01)
*H02M 1/42* (2007.01)

(52) U.S. Cl.
CPC ......... *H02M 7/217* (2013.01); *H02M 1/4258* (2013.01)

(58) Field of Classification Search
CPC .......... H02M 7/02; H02M 7/04; H02M 7/217; H02M 1/42; H02M 1/4258
See application file for complete search history.

(56) References Cited

U.S. PATENT DOCUMENTS

| | | | | |
|---|---|---|---|---|
| 6,115,267 A | * | 9/2000 | Herbert ................ | H02M 7/217 363/25 |
| 2003/0133317 A1 | * | 7/2003 | Norrga ................ | H02M 7/219 363/127 |
| 2006/0062032 A1 | * | 3/2006 | Soldano ................ | H03K 17/74 363/125 |
| 2006/0262576 A1 | * | 11/2006 | Przybyla ............... | H02M 7/219 363/21.02 |
| 2008/0037290 A1 | * | 2/2008 | Suzuki ................ | H02M 7/217 363/25 |

(Continued)

FOREIGN PATENT DOCUMENTS

| KR | 10-1086148 B1 | 11/2011 |
|---|---|---|
| KR | 10-2017-0116415 A | 10/2017 |
| KR | 10-2020-0003587 A | 1/2020 |

OTHER PUBLICATIONS

Jauch et al., Single-Phase Single-Stage Bidirectional Isolated ZVS AC-DC Converter with PFC, 15th International Power Electronics and Motion Control Conference, Sep. 4-6, 2012, 9 pages, IEEE, Serbia.

(Continued)

*Primary Examiner* — Gary L Laxton

(57) ABSTRACT

An alternating current (AC)-to-direct current (DC) (AC-DC) converter circuit system, and a method of designing the AC-DC converter circuit system. The AC-DC converter circuit system includes an AC-DC converter configured to receive an AC grid input from an electric power source and convert the AC grid input into DC battery power. The AC-DC converter may include a primary transformer including a plurality of field-effect transistors (FETs), and a secondary transformer configured to allow the DC battery power to be output from a grid that is allowed to have a positive value by the primary transformer.

16 Claims, 9 Drawing Sheets

(56) References Cited

U.S. PATENT DOCUMENTS

2013/0051102 A1\* 2/2013 Huang ................. H02M 7/217
                                                    363/128
2018/0145595 A1\* 5/2018 Fontana ................. H02M 1/44
2021/0036631 A1\* 2/2021 Deng ................. H02M 7/1626
2022/0045595 A1\* 2/2022 Kobayashi ............ H02M 3/158

OTHER PUBLICATIONS

Lee et al., A Single-Phase Battery Charger Design for LEV Based on DC-SRC With Resonant Valley-Fill Circuit, IEEE Transactions on Industrial Electronics, Apr. 2015, p. 2195-2205, vol. 62, issue 4, IEEE, Piscataway, New Jersey.

\* cited by examiner

AC-DC CONVERTER CIRCUIT SYSTEM AND METHOD OF DESIGNING AC-DC CONVERTER CIRCUIT SYSTEM

CROSS-REFERENCE TO RELATED APPLICATION(S)

This application claims the benefit of Korean Patent Application No. 10-2020-0090287 filed on Jul. 21, 2020, in the Korean Intellectual Property Office, the entire disclosure of which is incorporated herein by reference for all purposes.

BACKGROUND

1. Field of the Invention

One or more example embodiments relate to an alternating current (AC)-to-direct current (DC) (AC-DC) converter circuit system that may reduce a manufacturing cost and a volume of a converter circuit and increase an efficiency, by removing a bridge diode and a boost converter from the converter circuit, and relate to a method of designing the AC-DC converter circuit system.

In particular, the example embodiments provide a technology of simplifying a circuit by reducing a number of power conversion stages from existing three stages to a single stage in a converter circuit.

2. Description of the Related Art

An electric vehicle is a vehicle that operates using electricity as a power source.

The electric vehicle uses an electric battery and an electric motor, instead of using petroleum fuel and an engine, to rotate a motor with electricity accumulated in a battery so that the electric vehicle may operate. Electricity generated through heat or chemical reactions such as a fuel cell and a solar cell may be utilized for accumulation of electricity in the battery.

In such accumulation of electricity in the electric vehicle, a power factor correction (PFC) circuit may refer to a circuit that controls a series of processes in which a grid is input from a power supply battery through, for example, a charging gun, and the like so that power is accumulated in a battery of an electric vehicle.

Recently, a wireless charging scheme in addition to a wired charging scheme is being used to realize battery electricity accumulation in an electric vehicle, thereby increasing the convenience of charging.

Conventionally, patents and research have been mainly made on wireless charging technology for a battery with a two-stage structure, and many results thereof have been published.

However, since there are not many patents and research cases for a single-stage structure, it is difficult to find a research case for a converter suitable for a single-stage structure, and a control method.

A wireless power transfer refers to a wireless charging scheme of wirelessly transmitting power without a line connection and performing charging. In a wireless charging technology, wireless chargers for mobile phones first appeared in 2012, and since then the technology has been gradually advanced. In addition, due to the advancement of technology, application technologies to which the wireless charging technology is applied are diversifying together.

The wireless charging technology is being applied to almost all fields in which batteries are used, for example, mobile phone batteries, induction heaters, or electric vehicles.

The market trend of wireless charging devices by year shows an increase in the scale of the wireless charging-related market every year. Accordingly, many domestic companies are trying to secure wireless charging technologies. In addition, overseas global companies are expanding their share of the wireless charging market. For this reason, there is an urgent need to secure leading technologies related to wireless charging.

As environmental pollution such as global warming rises worldwide, efforts to reduce energy consumption are being made in various forms. In particular, as the market such as smartphones, wearable devices, notebook computers, tablets, or electric vehicles increases in size, an amount of electric energy to be used tends to rapidly increase.

In such an environment, to reduce environmental pollution, there is a need to reduce power consumption. To effectively reduce power consumption, the power efficiency of a power conversion device may need to increase.

Accordingly, most countries are increasingly demanding a power conversion device with a high efficiency.

In addition, since a wireless charger requires a power conversion device for converting an alternating current (AC) input into direct current (DC) power, a wireless charger with a high efficiency is also gradually required. Accordingly, recently, research on a high-efficiency wireless power transmission device is more necessarily required.

FIG. 1 is a diagram illustrating an example of a wireless charging circuit including a converter circuit according to a related art.

Referring to FIG. 1, the wireless charging circuit according to the related art may include a bridge diode 110, a PFC stage 120, a DC-DC stage 130, and a battery 140.

The bridge diode 110 may function to rectify an AC grid input to a DC.

The PFC stage 120 may function to minimize reactive power and convert three-phase or single-phase AC power from the grid into stable DC power. The PFC stage 120 may be controlled by a PFC converter.

The DC-DC stage 130 may function to adjust the DC power converted at the grid according to a battery voltage protocol. In addition, the DC-DC stage 130 may include a transformer for wireless charging. In the DC-DC stage 130, AC may be transmitted at a DC-DC transmission (Tx) side, and the received AC may be reconverted into DC at a DC-DC reception (Rx) side.

The battery 140 may be located behind the DC-DC stage 130 and may perform charging by receiving DC power supplied from the DC-DC stage 130.

However, the wireless charging circuit of FIG. 1 according to the related art has a large number of limitations.

First, the wireless charging circuit has low marketability due to high cost caused by a large number of devices.

The wireless charging circuit may be configured with multiple stages, for example, the bridge diode 110, a PFC converter in the PFC stage 120, or a DC-DC converter in the DC-DC stage 130. Since different devices are included in each of the stages, the wireless charging circuit with a large number of stages has a high cost.

Also, since the PFC stage 120 and the DC-DC stage 130 are controlled by different controllers, that is, the PFC converter and the DC-DC converter, a control stage is also complicated.

Therefore, to secure the market competitiveness of the actual product, it is essential to lower the production cost and develop a technology of eliminating and integrating each power conversion stage.

In addition, the wireless charging circuit has a high conduction loss in the bridge diode 110.

The bridge diode 110 may be a diode used to convert AC power into DC power. The bridge diode 110 has a simple structure because rectification is performed using a diode, but a forward voltage drop of 1 volts (V) or greater may occur. In particular, the entire input current passes through two bridge diodes 110 in the wireless charging circuit, which may lead to a significant power loss.

Thus, to reduce the power loss, the bridge diode 110 may need to be replaced or removed from the wireless charging circuit.

In addition, the wireless charging circuit has a risk of a switching loss and a conduction loss of the PFC converter.

Generally, a boost converter for boosting an AC grid input of 110 to 220 V to about 400 V is used as a PFC converter. The boost converter has advantages in that an input current continues to flow and an input filter is easily configured, but a great conduction loss and switching loss occur, which may result in a power loss.

In particular, similarly to the bridge diode 110, a significant loss of output power of the PFC converter may occur due to a great conduction loss occurring while the output power is passing through a diode at an output side.

Thus, to reduce a loss of the boost converter, the wireless charging circuit may need to introduce a new power factor compensation mechanism.

The DC-DC converter of the wireless charging circuit may convert a DC voltage of a Tx link capacitor into AC. Accordingly, on the DC-DC Tx side, DC may be reconverted into AC. An AC component at the DC-DC Tx side may be transmitted to a secondary side by passing through a transformer. On the DC-DC Rx side that is the secondary side, the battery 140 is charged through rectification of the AC component.

Thus, the wireless charging circuit requires multiple processes of converting the type of power from AC to DC, from DC to AC, and from AC back to DC.

To eliminate such an unnecessary process, there is a need to minimize a process of converting the type of power through a power conversion device that performs a process of repeatedly converting the type of power from AC to DC in only one stage.

SUMMARY

Example embodiments provide an alternating current (AC)-to-direct current (DC) (AC-DC) converter circuit system that may reduce a manufacturing cost and a volume of a circuit and increase an efficiency, by removing a bridge diode and a boost converter from an existing converter circuit, and provide a method of designing the AC-DC converter circuit system.

In addition, the example embodiments provide a technology of simplifying a circuit by reducing a number of power conversion stages from existing three stages to a single stage in a converter circuit.

According to an aspect, an AC-DC converter circuit system includes an AC-DC converter configured to receive an AC grid input from an electric power source and convert the AC grid input into DC power. The AC-DC converter may include a primary transformer including a plurality of field-effect transistors (FETs), and a secondary transformer configured to allow the DC power to be output from a grid that is allowed to have a positive value by the primary transformer.

According to another aspect, a method of designing an AC-DC converter circuit system includes receiving, by an AC-DC converter, an AC grid input from an electric power source, the AC-DC converter including a primary transformer including a plurality of FETs, and allowing, by a secondary transformer of the AC-DC converter, DC power to be output from a grid that is allowed to have a positive value by the primary transformer.

Additional aspects of example embodiments will be set forth in part in the description which follows and, in part, will be apparent from the description, or may be learned by practice of the disclosure.

According to example embodiments, an AC-DC converter circuit system and a method of designing the AC-DC converter circuit system may be provided to reduce a manufacturing cost and a volume of a circuit and increase an efficiency by removing a bridge diode and a boost converter from an existing converter circuit.

In addition, according to example embodiments, it is possible to simplify a circuit by reducing a number of power conversion stages from existing three stages to a single stage in a converter circuit.

BRIEF DESCRIPTION OF THE DRAWINGS

These and/or other aspects, features, and advantages of the invention will become apparent and more readily appreciated from the following description of example embodiments, taken in conjunction with the accompanying drawings of which.

DETAILED DESCRIPTION

Figure 1:
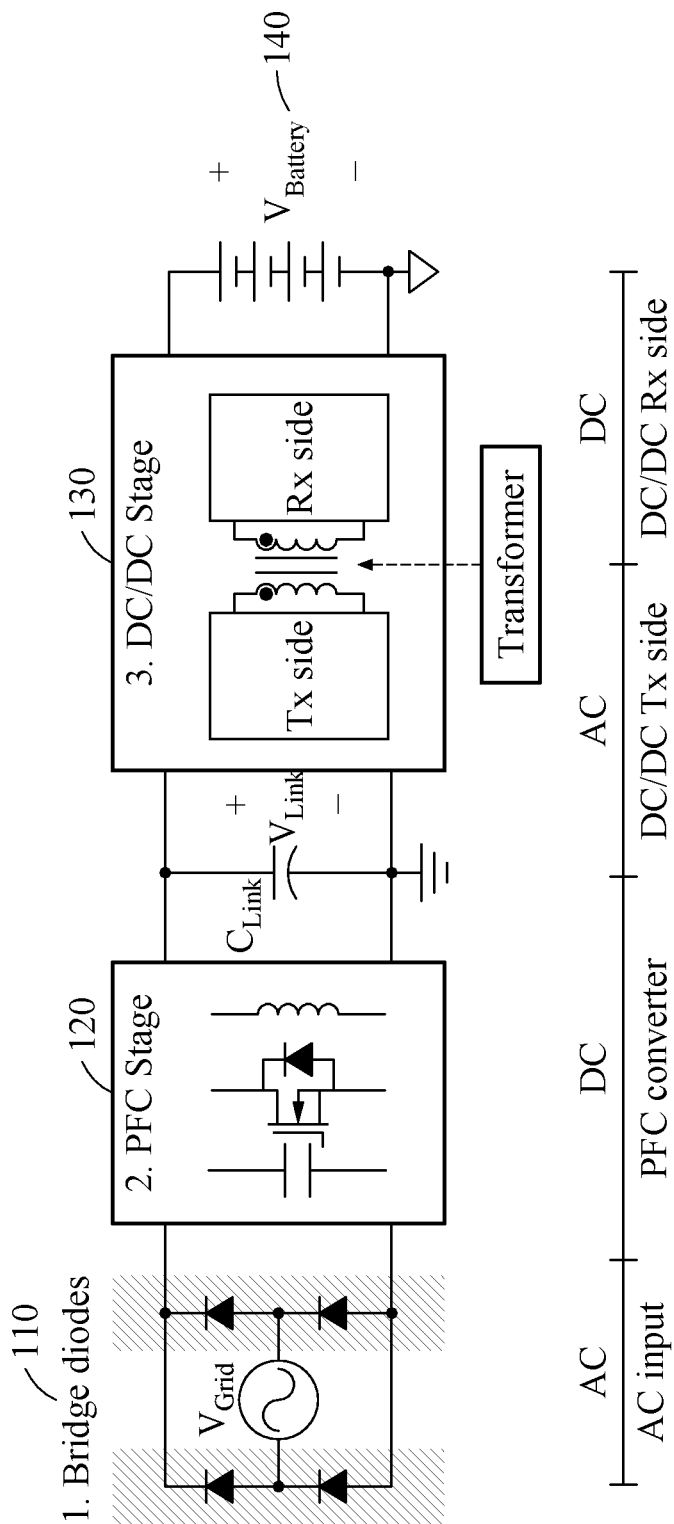
FIG. 1 is a diagram illustrating an example of a wireless charging circuit including a converter circuit according to a related art.

Hereinafter, example embodiments will be described in detail with reference to the accompanying drawings. The scope of the right, however, should not be construed as limited to the example embodiments set forth herein. The example embodiments should be understood to include all changes, equivalents, and replacements within the idea and the technical scope of the disclosure.

The terminology used herein is for the purpose of describing particular example embodiments only and is not to be limiting of the example embodiments. As used herein, the singular forms "a," "an," and "the" are intended to include the plural forms as well, unless the context clearly indicates otherwise. As used herein, the terms "include," "comprise," and "have" specify the presence of stated features, numbers, operations, elements, components, and/or combinations thereof, but do not preclude the presence or addition of one or more other features, numbers, operations, elements, components, and/or combinations thereof.

Unless otherwise defined, all terms used herein including technical or scientific terms have the same meanings as those generally understood consistent with and after an understanding of the present disclosure. Terms, such as those defined in commonly used dictionaries, should be construed to have meanings matching with contextual meanings in the relevant art and the present disclosure, and are not to be construed as an ideal or excessively formal meaning unless otherwise defined herein.

When describing the example embodiments with reference to the accompanying drawings, like reference numerals refer to like components and a repeated description related thereto will be omitted. When it is determined detailed description related to a related known function or configuration they may make the purpose of the present disclosure unnecessarily ambiguous in describing the present disclosure, the detailed description will be omitted here.

Figure 2:
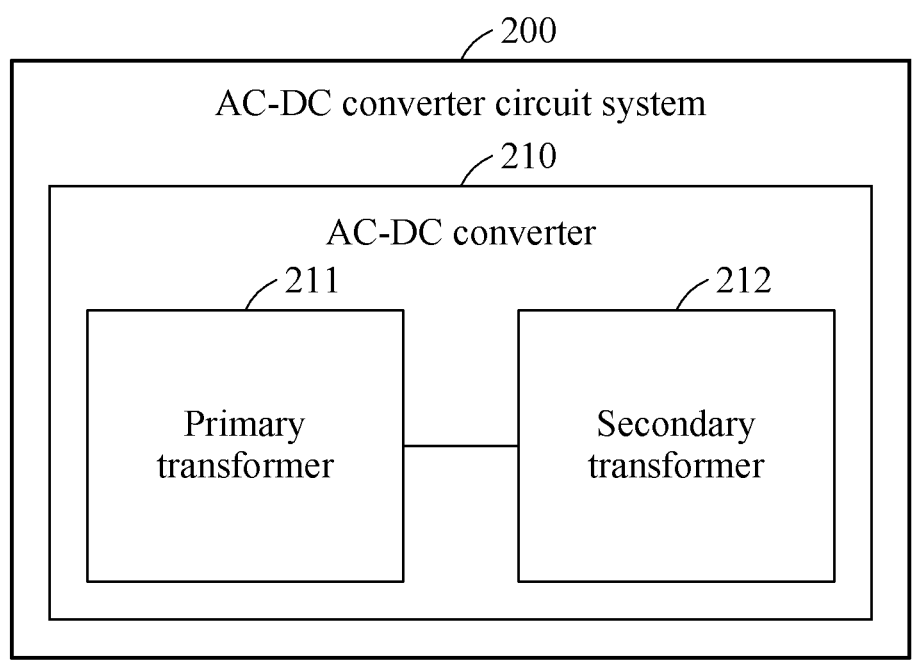
FIG. 2 is a block diagram illustrating an example of a configuration of an alternating current (AC)-to-direct current (DC) (AC-DC) converter circuit system according to an example embodiment of the present disclosure.

FIG. 2 is a block diagram illustrating an example of a configuration of an alternating current (AC)-to-direct current (DC) (AC-DC) converter circuit system according to an example embodiment of the present disclosure.

Referring to FIG. 2, an AC-DC converter circuit system 200 according to an example embodiment may include an AC-DC converter 210. The AC-DC converter 210 may include a primary transformer 211 on a primary side, and a secondary transformer 212 on a secondary side.

The AC-DC converter 210 may receive an AC grid input from an electric power source and may convert the AC grid input into DC battery power. In other words, the AC-DC converter 210 may function to directly receive AC power and convert the AC power into DC battery power for charging a battery.

The AC-DC converter 210 may directly receive the AC grid input, to create an environment in which a bridge diode is removed from an existing converter circuit. In other words, the AC-DC converter 210 may receive the AC grid input, so that a bridge diode for a grid rectification may be removed.

The AC-DC converter 210 may include the primary transformer 211 and the secondary transformer 212, to convert the AC grid input into the DC battery power.

The primary transformer 211 on the primary side of the AC-DC converter 210 may include a plurality of field-effect transistors (FETs) with bidirectional switches. For example, the primary transformer 211 may allow a value of an input grid to be expressed as only a positive value, through bidirectional switches that maintain a positive value of the AC and switch a negative value of the AC to a positive value.

Each of the plurality of FETs of the primary transformer 211 may include a pair of bidirectional switches that are connected in opposite directions to each other.

In a configuration of a pair of bidirectional switches, directions of the bidirectional switches may be opposite to each other. The opposite directions may indicate that whether each switch is drain-source and source-drain or a source-drain and drain-source is not taken into consideration.

By the plurality of FETs, an AC grid may be converted into a DC grid with only a positive waveform.

Also, on or off of each of the bidirectional switches may be determined based on an AC waveform of the grid.

In an example, when a waveform of the grid with a positive value is input, a portion of the bidirectional switches may be turned on, and the other bidirectional switch may be turned off. In another example, when a waveform of the grid with a negative value is input, the bidirectional switch being turned on may be switched to an off state, and the bidirectional switch being turned off may be switched to an on state, so that the bidirectional switches may operate complementarily.

For example, each of the plurality of FETs may include a pair of bidirectional switches $Q_{1B}$ and $Q_{1A}$ that are connected in opposite directions to each other, and a pair of bidirectional switches $Q_{2B}$ and $Q_{2A}$ that are connected in opposite directions to each other.

Similarly to a switch gate signal according to a positive value and a negative value of a grid of FIG. 5D that will be described below, when the AC grid input is received as a positive input, the bidirectional switches $Q_{1B}$ and $Q_{1A}$ may be turned on/off at the same time ratio, the bidirectional switch $Q_{2B}$ may be turned on/off complementarily to the time ratio of the bidirectional switches $Q_{2B}$ and $Q_{1A}$, and the bidirectional switch $Q_{2A}$ may be maintained to be turned on.

When the AC grid input is received as a negative input, the bidirectional switches $Q_{2B}$ and $Q_{2A}$ may be turned on/off at the same time ratio, the bidirectional switch $Q_{1A}$ may be turned on/off complementarily to the time ratio of the bidirectional switches $Q_{2B}$ and $Q_{2A}$, and the bidirectional switch $Q_{1B}$ may be maintained to be turned on.

In an example embodiment, an off state of at least one of the bidirectional switches $Q_{1B}$, $Q_{1A}$, $Q_{2B}$, and $Q_{2A}$ may be determined, thereby preventing an unnecessary switching loss.

In an example, when the AC grid input is received as a positive input, the bidirectional switch $Q_{2A}$ may be maintained to be turned on to prevent a switching loss of the bidirectional switch $Q_{2A}$. When the AC grid input is received as a negative input, the bidirectional switch $Q_{1B}$ may be maintained to be turned on to prevent a switching loss of the bidirectional switch $Q_{1B}$.

In another example embodiment, when each of the plurality of FETs includes a pair of bidirectional switches $Q_{1B}$ and $Q_{1A}$ that are connected in opposite directions to each other, and a pair of bidirectional switches $Q_{2B}$ and $Q_{2A}$ that are connected in opposite directions to each other, when the AC grid input is received as a positive input, and when the bidirectional switches $Q_{2B}$ and $Q_{1A}$ are alternately switched on/off, the bidirectional switch $Q_{2A}$ may be determined to remain on, and the bidirectional switch $Q_{2B}$ may be determined to be turned on or off based on the bidirectional switch $Q_{1B}$ or $Q_{1A}$.

In another example, when the AC grid input is received as a negative input, and when the bidirectional switches $Q_{2B}$ and $Q_{2A}$ are alternately switched on/off, the bidirectional switch $Q_{1B}$ may be determined to remain on, and the bidirectional switch $Q_{1A}$ may be determined to be turned on or off based on the bidirectional switch $Q_{2B}$ or $Q_{2A}$.

In other words, in response to positive AC power, the bidirectional switches $Q_{1A}$ and $Q_{1B}$ may be switched on/off at the same duty, the bidirectional switch $Q_{2A}$ may continue to be turned on, and the bidirectional switch $Q_{2B}$ may be switched on/off complementarily to a duty of the bidirectional switches $Q_{1A}$ and $Q_{1B}$. Also, in response to negative AC power, the bidirectional switches $Q_{2A}$ and $Q_{2B}$ may be switched on/off at the same duty, the bidirectional switch $Q_{1B}$ may continue to be turned on, and the bidirectional switch $Q_{1A}$ may be switched on/off complementarily to a duty of the bidirectional switches $Q_{2A}$ and $Q_{2B}$.

In addition, the primary transformer 211 may further include a resonant capacitor CR and a leakage inductor $L_R$ (or an additional inductor) connected in series to the plurality of FETs, and may create an environment in which the AC grid input is directly received.

Here, the primary transformer 211 may adopt "n" kilohertz (kHz) or greater as a switching frequency so that a greatest current may be applied to the primary transformer 211 in an AC peak portion of the grid. Here, "n" may be a real number and may be flexibly designed by a designer of the present disclosure. In other words, the primary transformer 211 may determine a switching frequency of the primary transformer 211 to be a relatively high frequency, for example, 100 kHz or greater, to generate greatest battery power at each of AC positive and negative peak values.

The secondary transformer 212 on the secondary side of the AC-DC converter 210 may allow the DC battery power to be output from a grid that is allowed to have a positive value by the primary transformer 211. In other words, the secondary transformer 212 may function to minimize reactive power less than a reference value for the grid from which a negative value is eliminated and to perform conversion to stable DC power.

In addition, the secondary transformer 212 may connect a switch and a capacitor in parallel to a diode for outputting the DC battery power, to compensate for a dead zone, a power factor and total harmonic distortion (THD) performance. For example, referring to FIG. 4B, a pair of a switch and a capacitor corresponding to a circuit structure in which C and FET are combined may be connected in parallel to a diode D2 of the secondary transformer 212, and a pair of a switch and a capacitor may be connected in parallel to a diode D3 of the secondary transformer 212, so that an input current and an input voltage may be in phase, to eliminate the dead zone in which the input current disappears.

The secondary transformer 212 may output the DC battery power according to an AC waveform of the grid having the positive value and generate an average charging current $I_O$ from the AC waveform. In other words, the secondary transformer 212 may generate battery power of a switching frequency for rapidly switching according to the AC waveform and may output an average current $I_O$ for the generated battery power.

In addition, the secondary transformer 212 may replace a function of the PFC stage in the existing converter circuit, so that a boost converter for an AC power factor (PF) compensation may be removed from a front end.

In other words, the AC-DC converter 210 may receive the AC grid input and remove a bridge diode for a grid rectification and a boost converter for an AC power factor (PF) compensation, to be configured with a single stage.

According to an example embodiment of the present disclosure, an AC-DC converter circuit system and a method of designing the AC-DC converter circuit system may be provided to reduce a manufacturing cost and a volume of a circuit and increase an efficiency by removing a bridge diode and a boost converter from an existing converter circuit.

In addition, according to the present disclosure, it is possible to simplify a circuit by reducing a number of power conversion stages from existing three stages to a single stage in a converter circuit.

Figure 3:
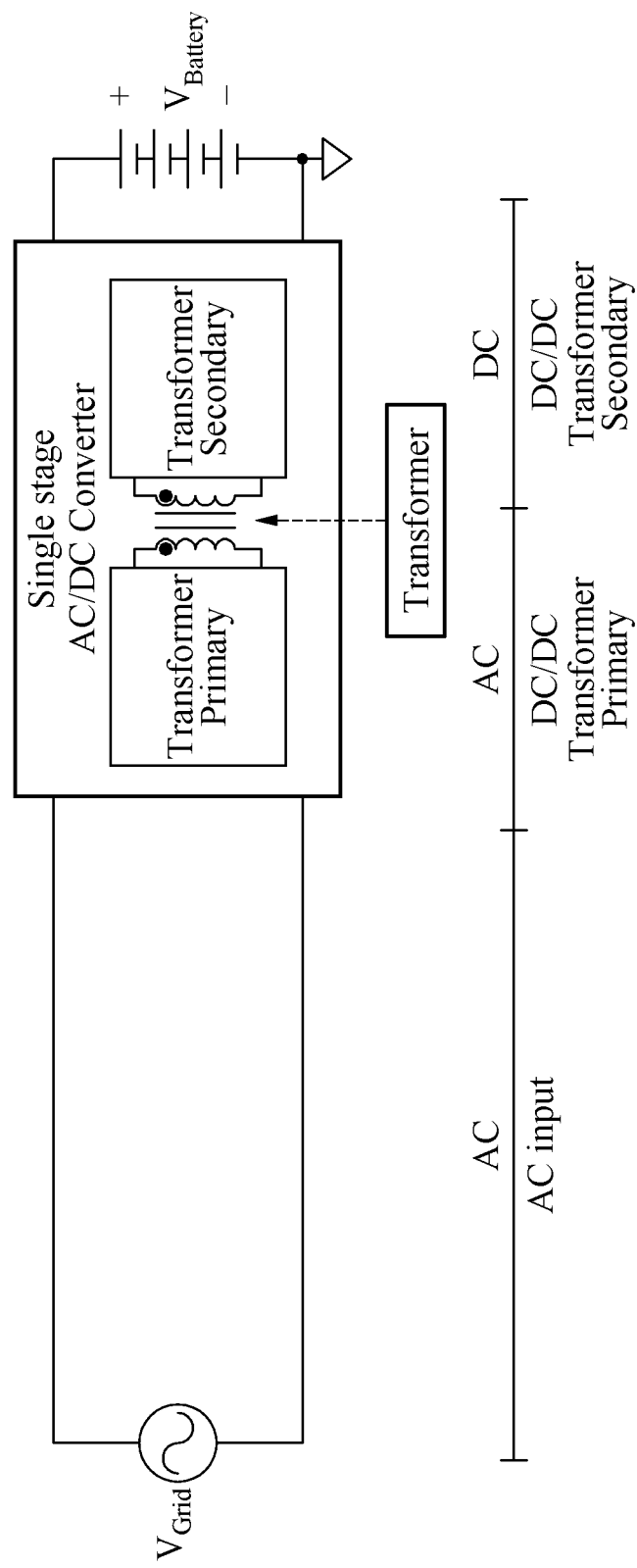
FIG. 3 is a diagram illustrating a principle of a proposed technology according to the present disclosure.

FIG. 3 is a diagram illustrating a principle of a proposed technology according to the present disclosure.

Referring to FIG. 3, the AC-DC converter circuit system 200 may be configured with a single stage.

The AC-DC converter circuit system 200 may directly convert an AC input into DC power, to improve conventional multiple conversion processes of converting AC to DC, DC to AC, and AC back to DC.

Thus, the proposed AC-DC converter circuit system 200 may reduce a volume and costs by reducing the number of power conversion stages, and may further enhance an efficiency of a converter circuit by removing a bridge diode and a boost converter.

The AC-DC converter circuit system 200 may establish a high-efficiency system at a relatively low cost, based on the above-described advantages, in comparison to an existing system.

Hereinafter, a new power conversion circuit for a structure of the proposed AC-DC converter circuit system 200, and a method of controlling the same will be described.

Figure 4A:
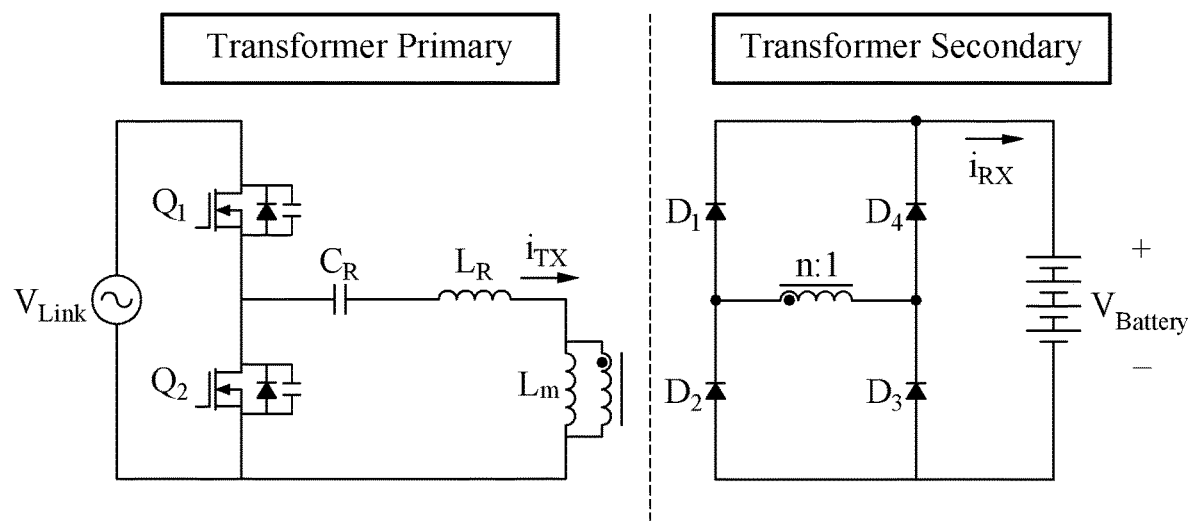
FIGS. 4A and 4B are diagrams for a comparison between a converter circuit according to a related art and an AC-DC converter circuit system according to the present disclosure.
Figure 4A:
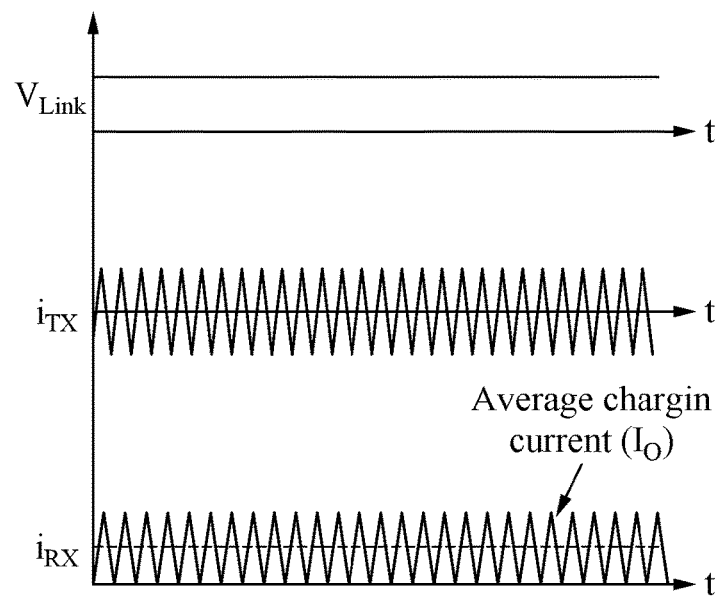
Figure 4B:
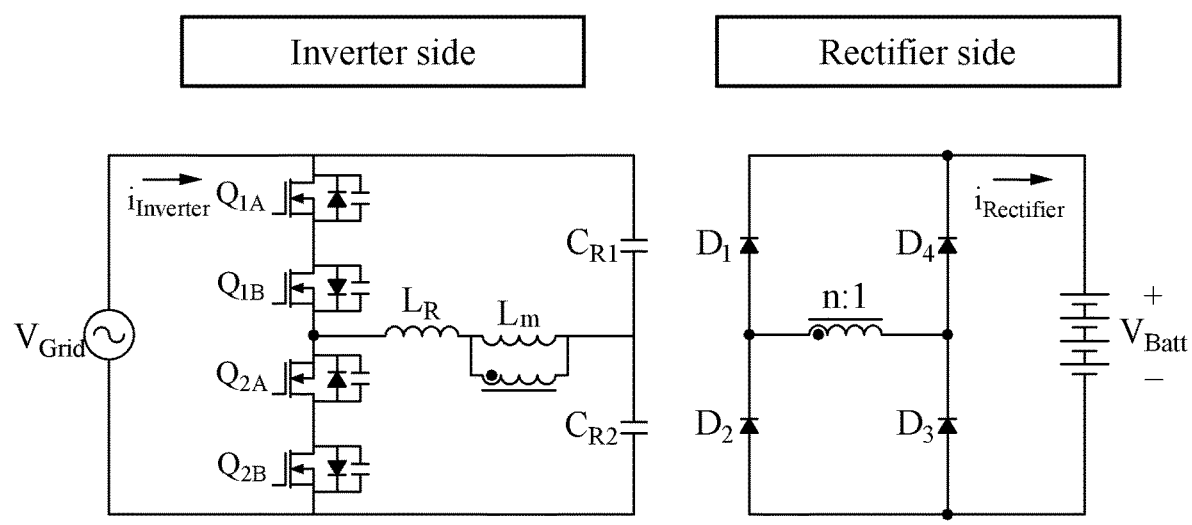

FIGS. 4A and 4B are diagrams for a comparison between a converter circuit according to a related art and an AC-DC converter circuit system according to the present disclosure.

FIG. 4A illustrates a DC-DC converter of an existing system and a main waveform thereof.

FIG. 4B illustrates a DC-DC converter of a proposed system and a main waveform thereof.

As shown in FIG. 4A, the DC-DC converter of the existing system includes two switches, and may perform switching at a set time ratio. Since the DC-DC converter of the existing system receives DC power as an input, a primary transformer may include two switches for generation of AC power.

As shown in FIG. 4B, since an AC input is applied in a proposed structure, a DC-DC converter with a pair of bidirectional switches $Q_{1B}$ and $Q_{1A}$ and a pair of bidirectional switches $Q_{2B}$ and $Q_{2A}$ may be used.

In addition, since a link voltage is DC power, the existing system may convert the DC power into AC and may transfer the AC to a secondary transformer. Subsequently, the secondary transformer may convert the received AC into DC power through rectification.

In other words, since the entire input is DC power in the existing system, an output may also be DC.

However, in the proposed structure, AC grid power may be directly applied as an input, and accordingly, a bridge diode or a PFC converter of the existing system may not be used. Although a frequency of a grid is in a range of 50 to 60 hertz (Hz), a switching frequency of a power conversion device may be extremely high, for example, 100 kHz or greater. Thus, the AC grid input may be received as a DC input in the proposed converter.

For example, if the proposed circuit continues to operate at a set time ratio, a great current may be applied in a portion with a high AC voltage. Accordingly, a current used for charging a battery may flow according to an AC shape of a grid without a change, thereby having a high power factor (PF).

In other words, the proposed circuit may 1) reduce a conductance loss by removing bridge diodes through bidirectional switches, and may 2) remove a PFC stage by controlling an output current to flow according to a shape of an AC voltage of a grid.

Therefore, it is possible to secure high marketability by reducing the total system cost and enhancing an efficiency through the proposed system and a power conversion circuit.

<Simulation Result>

A simulation of the proposed circuit was performed using a power simulation (PSIM) tool. Since such a simulation tool is being widely used by power conversion circuit engineers, reliability of the simulation tool is high.

Specifications of the simulation are shown in Table 1.

TABLE 1

| S company's wireless cleaning robot charging specifications | |
|---|---|
| Battery voltage range | 15-25 V |
| Charging scheme | CC-CV/MCC (up to 250 W) |
| Separation distance | Fixed at 2 centimeters (cm) |
| Coil turn ratio | 8:1 |
| Primary leakage inductance | 83.9 μH |
| Secondary leakage inductance | 12.0 μH |
| Primary magnetizing inductance | 334.4 μH |

The present inventor has conducted the simulation based on conditions of S company's wireless cleaning robot charging specifications. As a control scheme, CC-CV and MCC which are widely used in existing battery chargers were applied. Thus, it may be confirmed that the proposed system is applicable to a charging scheme according to the related art without a difficulty.

Also, the present inventor directly measured a leakage inductance and a magnetizing inductance of a product actually used. Accordingly, the present inventor has established an environment close to an actual charging situation by conducting the simulation.

As a result of the simulation, it may be confirmed that the proposed system and circuit operate normally, and accordingly an efficiency of the proposed circuit is verified. In addition, the present inventor confirmed that the additionally proposed circuit idea may cover even a PFC function.

The proposed circuit may be transformed into various topologies by changing a switch structure of a topology used as an existing DC-DC converter. Accordingly, in the present disclosure, various topologies may be applied according to characteristics of an application, and thus an application possibility may be extremely high.

While the related art is designed as a multi-stage system with bridge diodes, a PFC converter, and a DC-DC converter, the proposed technology may be configured as a single-stage system.

In addition, a converter according to the related art is configured with a unidirectional switch, whereas the proposed converter may be configured with a bidirectional switch.

While the related art is designed as a multi-stage system with bridge diodes, a PFC converter, and a DC-DC converter, the proposed technology may be configured as a single-stage system, thereby reducing a system construction cost and having a high efficiency.

Since the converter according to the related art includes a unidirectional switch, only a DC power input may be applied. On the contrary, since the proposed converter includes bidirectional switches, both an AC power input and DC power input may be applied. Thus, the proposed converter may be easily applied to various applications.

FIGS. 5A to 5D are diagrams illustrating another example of a configuration of an AC-DC converter circuit system according to an example embodiment of the present disclosure.

Recently, many studies are being conducted to extend a life of an on-board charger (OBC) of an electric vehicle by removing an electrolytic capacitor (link capacitor) from an AC-DC converter mounted on the OBC.

Figure 5A:
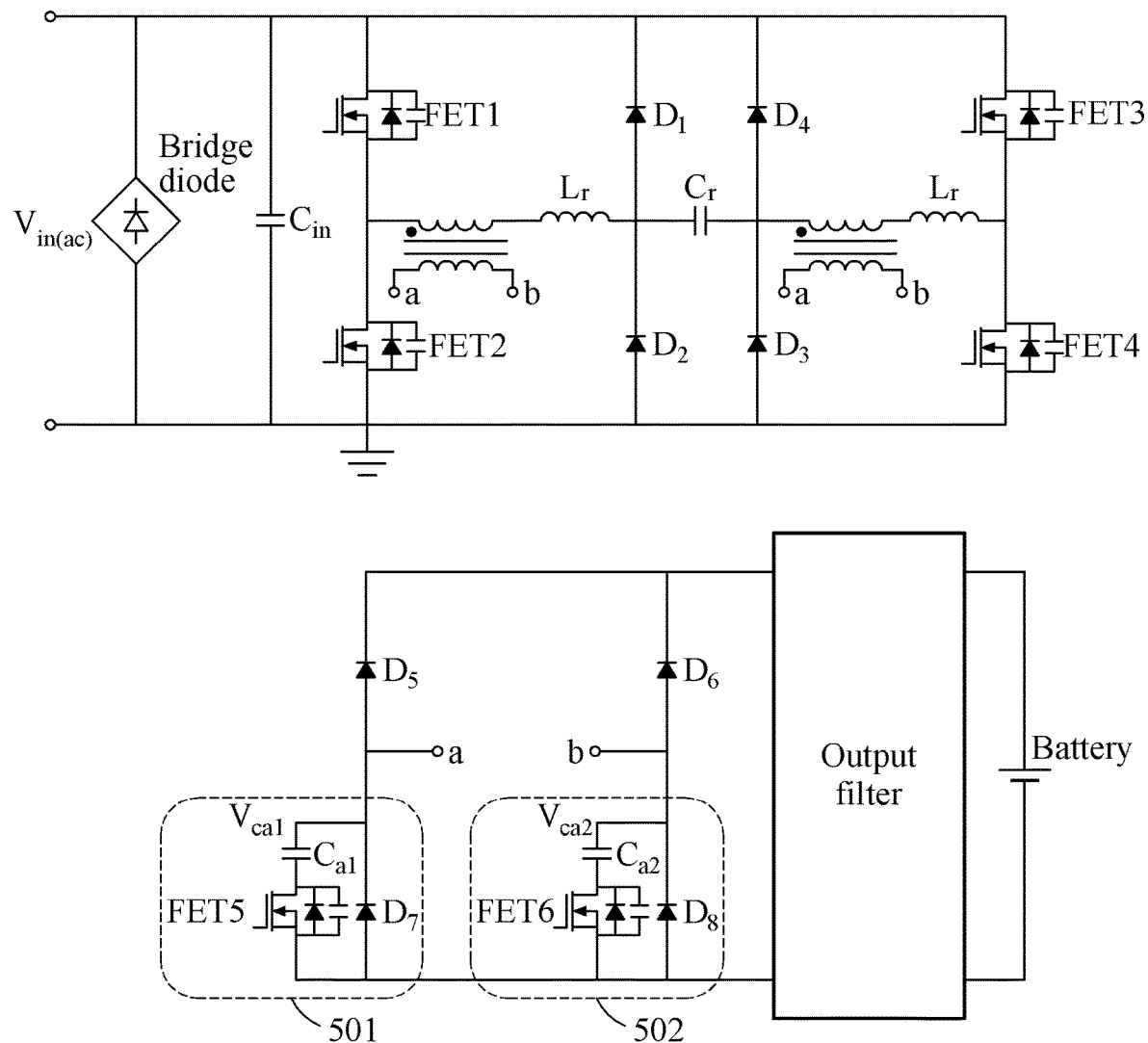
FIGS. 5A to 5D are diagrams illustrating another example of a configuration of an AC-DC converter circuit system according to an example embodiment of the present disclosure.

FIG. 5A illustrates an example of a circuit in which an electrolytic capacitor (link capacitor) is removed from an AC-DC converter.

The AC-DC converter of FIG. 5A may be an example of a circuit in which an electrolytic capacitor (link capacitor) is removed from an AC-DC converter disclosed in Institute of Electrical and Electronics Engineers (IEEE) transaction on industrial electronics.

The circuit of the FIG. 5A may have a single-stage structure by removing a PFC stage and a link capacitor.

However, the circuit of the FIG. 5A may use a bridge diode and an input capacitor $C_{in}$ without a change.

In addition, in the circuit of the FIG. 5A, a dead zone in which generation of a converted voltage on a secondary side is impossible even though an input voltage $V_{in(ac)}$ of an AC is received may be present.

Figure 5B:
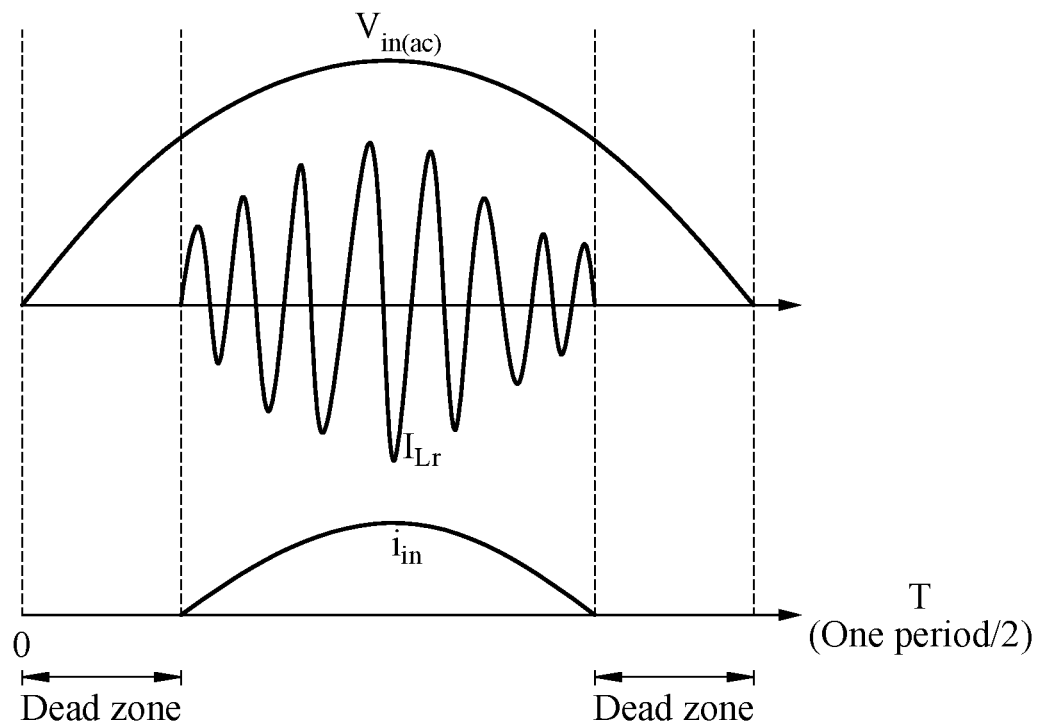

FIG. 5B illustrates a phase of the dead zone caused by the circuit of FIG. 5A.

In such a dead zone, the reactive power may need to be removed as much as possible by allowing the input voltage $V_{in(ac)}$ to be in phase with an input current $i_{in}$ so that a PFC circuit may have good power factor performance.

FIG. 5B shows the dead zone in which the power factor performance deteriorates due to an absence of the input current because the input voltage $V_{in(ac)}$ and the input current $i_{in}$ are not exactly in phase.

In the present disclosure, to eliminate the dead zone, a pair of a switch and a capacitor may be added in parallel to a diode 7 and a pair of a switch and a capacitor may be added in parallel to a diode 8, on the secondary side, as indicated by reference numerals 501 and 502 of FIG. 5A.

Figure 5C:
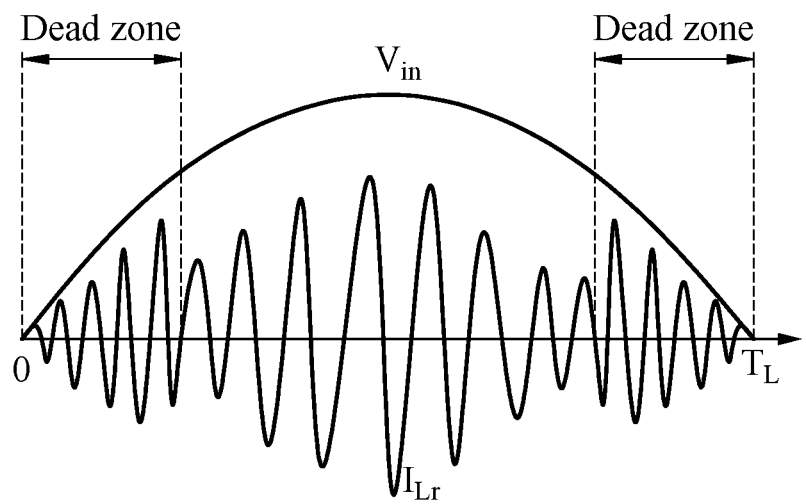

The pair of the switch and the capacitor added in parallel to each of the diode 7 and the diode 8 may randomly generate a voltage and a current in the dead zone, so that one period of $V_{in}$ may be filled with a current $I_{Lr}$, to allow an input current to be in phase with an input voltage, as shown in FIG. 5C.

Figure 5D:
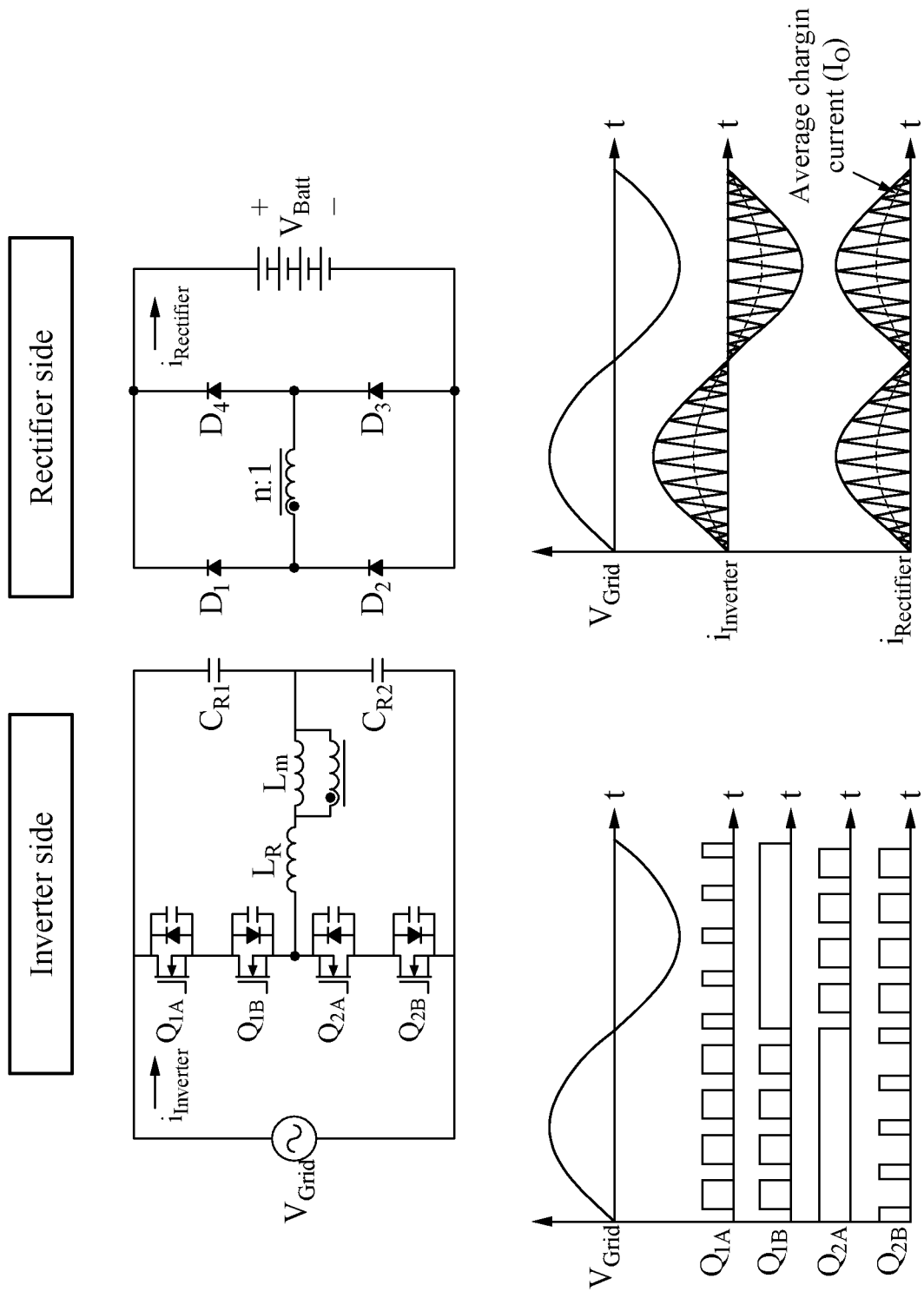

FIG. 5D illustrates an example in which a method of solving the above-described dead zone problem is applied to the AC-DC converter circuit system according to the present disclosure.

Referring to FIG. 5D, each of a plurality of FETs included in a primary transformer may include a pair of bidirectional switches $Q_{1B}$ and $Q_{1A}$ and a pair of bidirectional switches $Q_{2B}$ and $Q_{2A}$. When an AC grid input is received as a positive input, the bidirectional switches $Q_{1B}$, $Q_{1A}$ and $Q_{2B}$ may be determined to be turned on, and the bidirectional switch $Q_{2A}$ may be determined to be turned off.

When the AC grid input is received as a negative input, the bidirectional switches $Q_{1B}$, $Q_{1A}$ and $Q_{2B}$ may be determined to be turned off, and the bidirectional switch $Q_{2A}$ may be determined to be turned on.

An off state of at least one of the bidirectional switches $Q_{1B}$, $Q_{1A}$, $Q_{2B}$, and $Q_{2A}$ may be determined, thereby preventing an unnecessary switching loss.

The primary transformer may further include a resonant capacitor CR and a leakage inductor $L_R$ (or an additional inductor) connected in series to the plurality of FETs, to directly receive the AC grid input.

Although not shown, depending on example embodiments, a pair of a switch and a capacitor may be connected in parallel to a diode 2D of a secondary transformer, and similarly a pair of a switch and a capacitor may be connected in parallel to a diode D3. The pair of the switch and the capacitor may have a circuit structure in which C and FET are combined.

The pair of the switch and the capacitor added in parallel to each of the diode D2 and the diode D3 may randomly generate a voltage and a current in the dead zone, so that one period of $V_{in}$ may be filled with the current $I_{Lr}$, to allow an input current to be in phase with an input voltage, as shown in FIG. 5C.

Accordingly, a rectifier diode, an input capacitor, and a link capacitor, which are previously used, may all be removed, and thus it is possible to reduce a number of elements, a cost, a weight, or a volume of the AC-DC converter circuit system according to the present disclosure.

In addition, when the AC-DC converter circuit system according to the present disclosure is applied to an OBC of an electric vehicle, a link capacitor (an electrolytic capacitor) may be removed with the recent research trend, thereby extending the life of an electronic unit of the electric vehicle.

Furthermore, the AC-DC converter circuit system according to the present disclosure may output a gate signal for controlling four switches of the primary transformer.

In an example, when input AC power has a positive phase, the bidirectional switch $Q_{2A}$ may be turned on and the bidirectional switches $Q_{1A}$, $Q_{1B}$ and $Q_{2B}$ may complementarily operate, based on the gate signal for controlling the four switches of the primary transformer.

In another example, when the input AC power has a negative phase, the bidirectional switch $Q_{1B}$ may be turned on and the bidirectional switches $Q_{1A}$, $Q_{2A}$ and $Q_{2B}$ may complementarily operate.

Depending on example embodiments, the AC-DC converter circuit system may continue to maintain an off state of one FET, thereby preventing an unnecessary switching loss.

Hereinafter, a workflow for a design of the AC-DC converter circuit system 200 will be described in detail with reference to FIG. 6.

Figure 6:
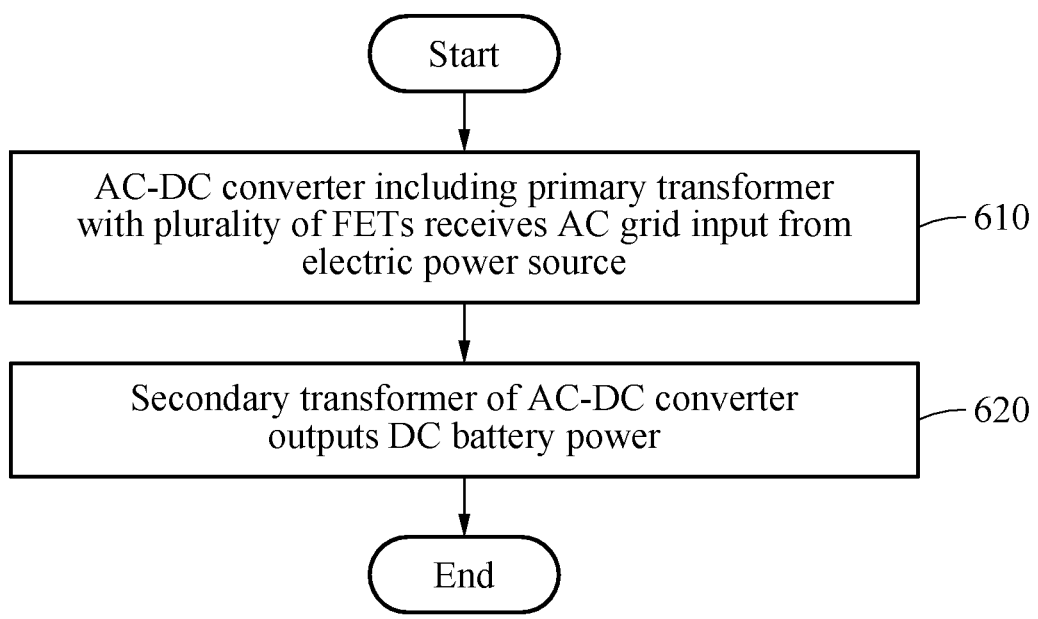
FIG. 6 is a flowchart illustrating a method of designing an AC-DC converter circuit system according to an example embodiment of the present disclosure.

FIG. 6 is a flowchart illustrating a method of designing an AC-DC converter circuit system according to an example embodiment of the present disclosure.

Referring to FIG. 6, in operation 610, an AC-DC converter that is included in the AC-DC converter circuit system 200 may receive an AC grid input from an electric power source and may convert the AC grid input into DC battery power. Operation 610 may be a process of directly receiving AC power and converting the AC power into DC battery power for charging a battery.

The AC-DC converter may directly receive the AC grid input, to create an environment in which a bridge diode is removed from an existing converter circuit. In other words, the AC-DC converter may receive the AC grid input, so that a bridge diode for a grid rectification may be removed.

The AC-DC converter may include a primary transformer and a secondary transformer, to convert the AC grid input into DC battery power.

The primary transformer on a primary side of the AC-DC converter may include a plurality of FETs with bidirectional switches. For example, the primary transformer may allow a value of an input grid to be expressed as only a positive value, through bidirectional switches that maintain a positive value of the AC and switch a negative value of the AC to a positive value.

Each of the plurality of FETs of the primary transformer may include a pair of bidirectional switches that are connected in opposite directions to each other.

In a configuration of a pair of bidirectional switches, directions of the bidirectional switches may be opposite to each other. The opposite directions may indicate that whether each switch is drain-source and source-drain or a source-drain and drain-source is not taken into consideration.

By the plurality of FETs, an AC grid may be converted into a DC grid with only a positive waveform.

Also, on or off of each of the bidirectional switches may be determined based on an AC waveform of the grid.

In an example, when a waveform of the grid with a positive value is input, a portion of the bidirectional switches may be turned on, and the other bidirectional switch may be turned off. In another example, when a waveform of the grid with a negative value is input, the bidirectional switch being turned on may be switched to an off state, and the bidirectional switch being turned off may be switched to an on state, so that the bidirectional switches may operate complementarily.

For example, each of the plurality of FETs may include a pair of bidirectional switches $Q_{1B}$ and $Q_{1A}$ that are connected in opposite directions to each other, and a pair of bidirectional switches $Q_{2B}$ and $Q_{2A}$ that are connected in opposite directions to each other.

Similarly to a switch gate signal according to a positive value and a negative value of the grid of FIG. 5D, when the AC grid input is received as a positive input, the bidirectional switches $Q_{1B}$ and $Q_{1A}$ may be turned on/off at the same time ratio, the bidirectional switch $Q_{2B}$ may be turned on/off complementarily to the time ratio of the bidirectional switches $Q_{1B}$ and $Q_{1A}$, and the bidirectional switch $Q_{2A}$ may be maintained to be turned on.

When the AC grid input is received as a negative input, the bidirectional switches $Q_{2B}$ and $Q_{2A}$ may be turned on/off at the same time ratio, the bidirectional switch $Q_{1A}$ may be turned on/off complementarily to the time ratio of the bidirectional switches $Q_{2B}$ and $Q_{2A}$, and the bidirectional switch $Q_{1B}$ may be maintained to be turned on.

For example, when the AC grid input is received as a positive input, the bidirectional switch $Q_{2A}$ may be maintained to be turned on to prevent a switching loss of the bidirectional switch $Q_{2A}$. When the AC grid input is received as a negative input, the bidirectional switch $Q_{1B}$ may be maintained to be turned on to prevent a switching loss of the bidirectional switch $Q_{1B}$.

In an example embodiment, an off state of at least one of the bidirectional switches $Q_{1B}$, $Q_{1A}$, $Q_{2B}$, and $Q_{2A}$ may be determined, thereby preventing an unnecessary switching loss.

In another example embodiment, when each of the plurality of FETs includes a pair of bidirectional switches $Q_{1B}$ and $Q_{1A}$ that are connected in opposite directions to each other, and a pair of bidirectional switches $Q_{2B}$ and $Q_{2A}$ that are connected in opposite directions to each other, when the AC grid input is received as a positive input, and when the bidirectional switches $Q_{1B}$ and $Q_{1A}$ are alternately switched on/off, the bidirectional switch $Q_{2A}$ may be determined to remain on, and the bidirectional switch $Q_{2B}$ may be determined to be turned on or off based on the bidirectional switch $Q_{1B}$ or $Q_{1A}$.

In another example, when the AC grid input is received as a negative input, and when the bidirectional switches $Q_{2B}$ and $Q_{2A}$ are alternately switched on/off, the bidirectional switch $Q_{1B}$ may be determined to remain on, and the bidirectional switch $Q_{1A}$ may be determined to be turned on or off based on the bidirectional switch $Q_{2B}$ or $Q_{2A}$.

In other words, in response to positive AC power, the bidirectional switches $Q_{1A}$ and $Q_{1B}$ may be switched on/off at the same duty, the bidirectional switch $Q_{2A}$ may continue to be turned on, and the bidirectional switch $Q_{2B}$ may be switched on/off complementarily to a duty of the bidirectional switches $Q_{1A}$ and $Q_{1B}$. Also, in response to negative AC power, the bidirectional switches $Q_{2A}$ and $Q_{2B}$ may be switched on/off at the same duty, the bidirectional switch $Q_{1B}$ may continue to be turned on, and the bidirectional switch $Q_{1A}$ may be switched on/off complementarily to a duty of the bidirectional switches $Q_{2A}$ and $Q_{2B}$.

In addition, the primary transformer may further include a resonant capacitor CR and a leakage inductor $L_R$ (or an additional inductor) connected in series to the plurality of FETs, and may create an environment in which the AC grid input is directly received.

Here, the primary transformer may adopt "n" kHz or greater as a switching frequency so that a greatest current may be applied to the primary transformer in an AC peak portion of the grid. Here, "n" may be a real number and may be flexibly designed by a designer of the present disclosure. In other words, the primary transformer may determine a switching frequency of the primary transformer to be a relatively high frequency, for example, 100 kHz or greater, to generate greatest battery power at each of AC positive and negative peak values.

In operation 620, the secondary transformer on the secondary side of the AC-DC converter may allow the DC battery power to be output from a grid that is allowed to have a positive value by the primary transformer. In other words, the secondary transformer may function to minimize reactive power less than a reference value for the grid from which a negative value is eliminated and to perform conversion to stable DC power.

In addition, the secondary transformer may connect a switch and a capacitor in parallel to a diode for outputting the DC battery power, to compensate for a dead zone, a power factor and THD performance. For example, a pair of a switch and a capacitor corresponding to a circuit structure in which C and FET are combined may be connected in parallel to a diode D2 of the secondary transformer, and a pair of a switch and a capacitor may be connected in parallel to a diode D3 of the secondary transformer, so that an input current and an input voltage may be in phase, to eliminate the dead zone in which the input current disappears.

The secondary transformer may output the DC battery power according to an AC waveform of the grid having the positive value and generate an average charging current $I_O$ from the AC waveform. In other words, the secondary transformer may generate battery power of a switching frequency for rapidly switching according to the AC waveform and may output an average current $I_O$ for the generated battery power.

In addition, the secondary transformer may replace a function of the PFC stage in the existing converter circuit, so that a boost converter for an AC power factor (PF) compensation may be removed from a front end.

In other words, the AC-DC converter may receive the AC grid input and remove a bridge diode for a grid rectification and a boost converter for an AC power factor (PF) compensation, to be configured with a single stage.

According to an example embodiment of the present disclosure, an AC-DC converter circuit system and a method of designing the AC-DC converter circuit system may be provided to reduce a manufacturing cost and a volume of a circuit and increase an efficiency by removing a bridge diode and a boost converter from an existing converter circuit.

In addition, according to the present disclosure, it is possible to simplify a circuit by reducing a number of power conversion stages from existing three stages to a single stage in a converter circuit.

The method of designing the AC-DC converter circuit system according to the above-described example embodiments may be recorded in non-transitory computer-readable media including program instructions to implement various operations which may be performed by a computer. The media may also include, alone or in combination with the program instructions, data files, data structures, and the like. The program instructions recorded on the media may be those specially designed and constructed for the purposes of the example embodiments, or they may be of the well-known kind and available to those having skill in the computer software arts. Examples of non-transitory computer-readable media include magnetic media such as hard disks, floppy disks, and magnetic tape; optical media such as CD ROM discs and DVDs; magneto-optical media such as optical discs; and hardware devices that are specially configured to store and perform program instructions, such as read-only memory (ROM), random access memory (RAM), flash memory, and the like. Examples of program instructions include both machine code, such as code produced by a compiler, and files containing higher level code that may be executed by the computer using an interpreter. The described hardware devices may be configured to act as one or more software modules in order to perform the operations of the above-described example embodiments, or vice versa.

The software may include a computer program, a piece of code, an instruction, or some combination thereof, to independently or collectively instruct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software may also be distributed over network coupled computer systems so that the software may be stored or executed in a distributed fashion as a method of designing an AC-DC converter circuit system. The software and data may be stored by one or more non-transitory computer readable recording mediums.

While this disclosure includes example embodiments, it will be apparent to one of ordinary skill in the art that various changes in form and details may be made in these example embodiments without departing from the spirit and scope of the claims and their equivalents. The example embodiments described herein are to be considered in a descriptive sense only, and not for purposes of limitation. Descriptions of features or aspects in each example are to be considered as being applicable to similar features or aspects in other examples. Suitable results may be achieved if the described techniques are performed in a different order from the above-described method of designing an AC-DC converter circuit system, and/or if components in a described system, architecture, device, or circuit are combined in a different manner from the above-described method of designing an AC-DC converter circuit system, and/or replaced or supplemented by other components or their equivalents.

Therefore, the scope of the disclosure is defined not by the detailed description, but by the claims and their equivalents, and all variations within the scope of the claims and their equivalents are to be construed as being included in the disclosure.

What is claimed is:

1. An alternating current (AC)-to-direct current (DC) (AC-DC) converter circuit system comprising:
   an AC-DC converter configured to receive an AC input from an electric power source and convert the AC input into DC power,
   wherein the AC-DC converter comprises:
     a primary side that receives the AC input, the primary side comprising a plurality of field-effect transistors (FETs) that maintain a positive portion of the AC input to remain positive and switch a negative portion of the AC input to be positive to produce a positive AC waveform; and
a secondary side configured to allow the DC power to be output from the positive AC waveform of the primary side,
wherein the plurality of FETs of the primary side comprises a first pair of bidirectional switches, and on or off of each of the bidirectional switches is determined based on an AC waveform of the AC input, and
wherein each of the plurality of FETs comprises the first pair of bidirectional switches comprising a first bidirectional switch ($Q_{1A}$) and a second bidirectional switch ($Q_{1B}$) and a second pair of bidirectional switches comprising a third bidirectional switch ($Q_{2A}$) and a fourth bidirectional switch ($Q_{2B}$), and
when the AC input is received as a positive input, the first pair of bidirectional switches ($Q_{1B}$ and $Q_{1A}$) are turned on/off at a same time ratio, the fourth bidirectional switch ($Q_{2B}$) is turned on/off complementarily to the time ratio of the bidirectional switches ($Q_{1B}$ and $Q_{1A}$), and the third bidirectional switch ($Q_{2A}$) is maintained to be turned on, and
when the AC input is received as a negative input, the bidirectional switches ($Q_{2B}$ and $Q_{2A}$) are turned on/off at a same time ratio, the first bidirectional switch ($Q_{1A}$) is turned on/off complementarily to the time ratio of the bidirectional switches ($Q_{2B}$ and $Q_{2A}$), and the second bidirectional switch ($Q_{1B}$) is maintained to be turned on.

2. The AC-DC converter circuit system of claim 1, wherein
the plurality of FETs comprises the first pair of bidirectional switches comprising a first bidirectional switch ($Q_{1A}$) and a second bidirectional switch ($Q_{1B}$) and a second pair of bidirectional switches comprising a third bidirectional switch ($Q_{2A}$) and a fourth bidirectional switch ($Q_{2B}$), and
the first pair of bidirectional switches ($Q_{1B}$ and $Q_{1A}$) and the second pair of bidirectional switches ($Q_{2B}$ and $Q_{2A}$) are complementarily turned on/off.

3. The AC-DC converter circuit system of claim 1, wherein
when the AC input is received as a positive input, the third bidirectional switch ($Q_{2A}$) is maintained to be turned on to prevent a switching loss of the third bidirectional switch ($Q_{2A}$), and
when the AC input is received as a negative input, the second bidirectional switch ($Q_{1B}$) is maintained to be turned on to prevent a switching loss of the second bidirectional switch ($Q_{1B}$).

4. The AC-DC converter circuit system of claim 1, wherein the primary side further comprises a resonant capacitor ($C_R$) and an inductor ($L_R$) connected in series to the plurality of FETs, and is configured to directly receive the AC input.

5. The AC-DC converter circuit system of claim 1, wherein the primary side is configured to adopt "n" kilohertz (kHz) or greater as a switching frequency so that a greatest current is applied to the primary side in an AC peak portion of the AC input, "n" being a real number.

6. The AC-DC converter circuit system of claim 1, wherein the secondary side is configured to compensate for a dead zone, a power factor and total harmonic distortion (THD) performance by connecting a switch and a capacitor in parallel to a diode configured to output the DC power.

7. The AC-DC converter circuit system of claim 1, wherein the secondary side is configured to output the DC power according to an AC waveform of the AC input having the positive value and to generate an average charging current ($I_O$) from the AC waveform.

8. The AC-DC converter circuit system of claim 1, wherein the AC-DC converter is configured to receive the AC input and convert the AC input to the DC power in a single stage.

9. A method of designing an alternating current (AC)-to-direct current (DC) (AC-DC) converter circuit system, the method comprising:
receiving, by an AC-DC converter, an AC input from an electric power source, the AC-DC converter comprising a primary side comprising a plurality of field-effect transistors (FETs) that maintain a positive portion of the AC input to remain positive and switch a negative portion of the AC input to be positive to produce a positive AC waveform; and
outputting, by a secondary side of the AC-DC converter, DC power from the positive AC waveform of the primary side,
wherein each of the plurality of FETs of the primary side comprises a first pair of bidirectional switches that are connected in opposite directions to each other, and
on or off of each of the bidirectional switches is determined based on an AC waveform of the AC input, and
wherein the plurality of FETs comprises the first pair of bidirectional switches comprising a first bidirectional switch ($Q_{1A}$) and a second bidirectional switch ($Q_{1B}$) and a second pair of bidirectional switches comprising a third bidirectional switch ($Q_{2A}$) and a fourth bidirectional switch ($Q_{2B}$), and
when the AC input is received as a positive input, the first pair of bidirectional switches ($Q_{1B}$ and $Q_{1A}$) are turned on/off at a same time ratio, the fourth bidirectional switch ($Q_{2B}$) is turned on/off complementarily to the time ratio of the bidirectional switches ($Q_{1B}$ and $Q_{1A}$), and the third bidirectional switch ($Q_{2A}$) is maintained to be turned on, and
when the AC input is received as a negative input, the bidirectional switches ($Q_{2B}$ and $Q_{2A}$) are turned on/off at a same time ratio, the first bidirectional switch ($Q_{1A}$) is turned on/off complementarily to the time ratio of the bidirectional switches ($Q_{2B}$ and $Q_{2A}$), and the second bidirectional switch ($Q_{1B}$) is maintained to be turned on.

10. The method of claim 9, wherein
the plurality of FETs comprises the first pair of bidirectional switches comprising a first bidirectional switch ($Q_{1A}$) and a second bidirectional switch ($Q_{1B}$) and a second pair of bidirectional switches comprising a third bidirectional switch ($Q_{2A}$) and a fourth bidirectional switch ($Q_{2B}$), and
the first pair of bidirectional switches ($Q_{1B}$ and $Q_{1A}$) and the second pair of bidirectional switches ($Q_{2B}$ and $Q_{2A}$) are complementarily turned on/off.

11. The method of claim 9, wherein
when the AC input is received as a positive input, the third bidirectional switch ($Q_{2A}$) is maintained to be turned on to prevent a switching loss of the third bidirectional switch ($Q_{2A}$), and
when the AC input is received as a negative input, the second bidirectional switch ($Q_{1B}$) is maintained to be turned on to prevent a switching loss of the second bidirectional switch ($Q_{1B}$).

12. The method of claim 9, further comprising:
directly receiving, by the primary side, the AC input, the primary side further comprising a resonant capacitor ($C_R$) and a leakage inductor ($L_R$) connected in series to the plurality of FETs.

13. The method of claim 9, further comprising:
adopting, by the primary side, "n" kilohertz (kHz) or greater as a switching frequency so that a greatest current is applied to the primary side in an AC peak portion of the AC input, "n" being a real number.

14. The method of claim 9, further comprising:
compensating for, by the secondary side, a dead zone, a power factor and total harmonic distortion (THD) performance by connecting a switch and a capacitor in parallel to a diode configured to output the DC power.

15. The method of claim 9, further comprising:
outputting, by the secondary side, the DC power according to an AC waveform of the AC input having the positive value and generating an average charging current $I_O$ from the AC waveform.

16. The method of claim 9, wherein the AC-DC converter is configured to receive the AC input to be configured with a single stage.

* * * * *